United States Patent
Bonazzi

[15] 3,697,206
[45] Oct. 10, 1972

[54] PRESS FOR REBUILDING OF TIRES

[72] Inventor: Pericle Bonazzi, via 4 Nov., Boretto, Italy

[22] Filed: March 10, 1971

[21] Appl. No.: 122,794

[52] U.S. Cl. ..................425/20, 425/38, 425/357
[51] Int. Cl. .................................................B29h 5/02
[58] Field of Search.......18/2 TT, 2 TM, 2 TP, 17 W, 18/17 K, 18 F

[56] References Cited

UNITED STATES PATENTS

| | | | |
|---|---|---|---|
| 2,745,137 | 5/1956 | Glynn | 18/18 F |
| 2,812,547 | 11/1957 | Duerksen et al. | 18/18 F |
| 2,895,166 | 7/1959 | MacMillan | 18/18 F |
| 2,987,770 | 6/1961 | Powell | 18/18 F |
| 3,042,966 | 7/1962 | Laycox | 18/2 TT |
| 3,074,109 | 1/1963 | Duerksen | 18/18 F |
| 3,109,197 | 11/1963 | Sunday | 18/18 F |
| 3,137,032 | 6/1964 | MacMillan | 18/18 F X |
| 3,429,005 | 2/1969 | MacMillan | 18/18 F |
| 3,585,679 | 6/1971 | MacMillan et al. | 18/18 F X |

FOREIGN PATENTS OR APPLICATIONS

| | | | |
|---|---|---|---|
| 802,014 | 9/1958 | Great Britain | 18/2 TM |

Primary Examiner—J. Howard Flint, Jr.
Attorney—Clario Ceccon

[57] ABSTRACT

The retreading of automotive tires may be effected by means of a movable frame, guided on rails, supporting the upper half of a tire mold and a single set of controlling means for a plurality of press molds.

4 Claims, 4 Drawing Figures

PATENTED OCT 10 1972 3,697,206

PRESS FOR REBUILDING OF TIRES

The present invention relates to an improved press for retreading of tires, which has a frame movable on rails and carrying both the upper half of the press and the control mechanism for locking and unlocking the upper half of the press to and from the lower half of the press.

Heretofore, the known presses for retreading of tires for automotive purposes comprise generally a fixed base onto which is mounted the lower half of the press containing the mold for receiving the tire to be retreaded. On the said base there is also mounted, integrally therewith, a casing or frame onto which is mounted the upper half of the press, which upper half carries the mechanism for controlling the closing of the mold and the locking and unlocking of the two halves of the press during the pressing operation.

The elements mounted on the frame cooperate, therefore, with one another during the setting up of the retreading operation, but remain totally inoperative during the actual retreading period, that is, while the tire is being reformed. Obviously, the above-described set-up constitutes a considerably expensive waste of mechanical elements, because each individual press must be endowed with the entire control mechanism, which mechanism is then utilized only for a very limited period of time, while remaining idle during the proportionally lengthy period of retreading of the tire.

The present invention improves upon the known devices by providing a frame movable on guide rails and carrying the upper half of the press as well as the mechanism for controlling the locking and unlocking of the two halves of the press. The lower half of the press forms a static or fixed unit with which said movable upper half cooperates during the phases of aligning and locking in place of the mold.

The main object of the invention is, therefore, to provide a movable device independent of the fixed base which carries the lower half of the press, said movable device being further provided with the necessary mechanism for controlling the locking and unlocking of the upper and lower halves of the press for closing and opening, respectively, the mold.

Another object of the present invention is to provide an independently movable device capable of being brought in juxtaposition with a series of fixed bases, so as to effect a plurality of retreading operations with a single controlling mechanism. In this manner, a single control mechanism is utilized sequentially, and without idle periods of inactivity, to juxtapose, lock and unlock a plurality of molds' upper and lower halves aligned along the path of travel of the guide rail supporting the movable frame and its inherently attached control mechanism.

These and other objects of the invention will become apparent from the detailed description of the embodiments therefore set forth herebelow and from the accompanying drawings, in which.

Figure 1:
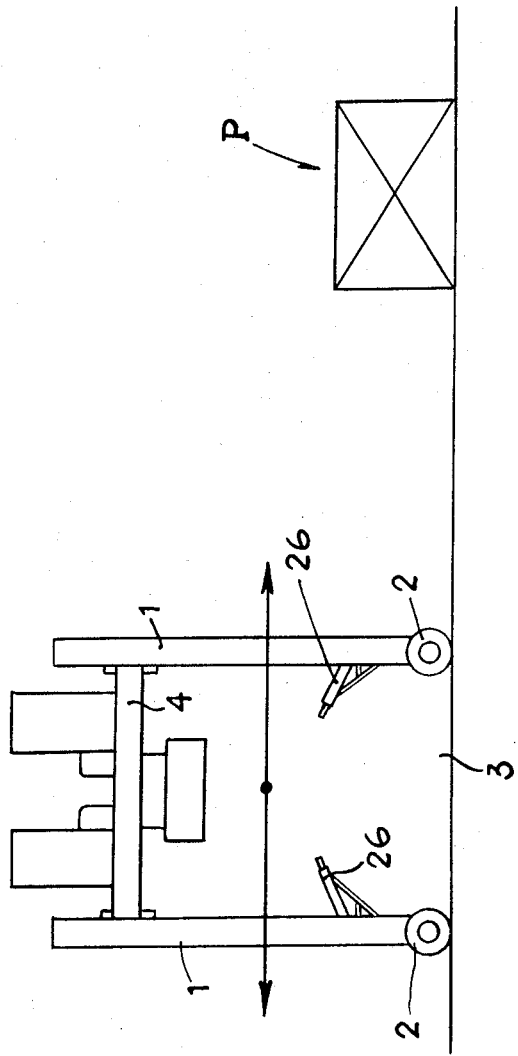
FIG. 1 shows schematically the assembled device of the invention.
Figure 4:
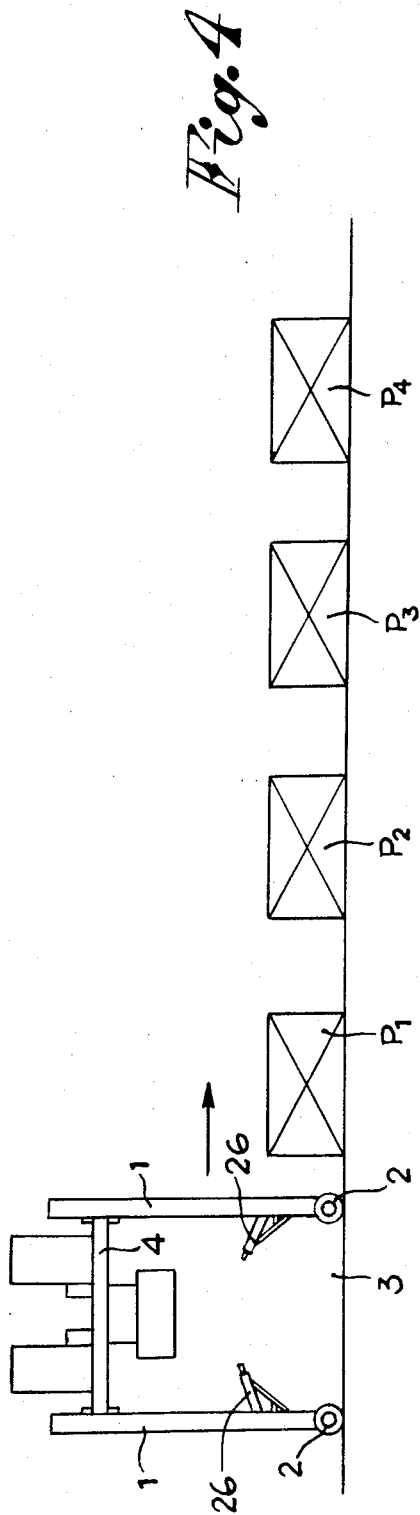
FIG. 4 shows schematically the device of the invention with a plurality of aligned molds.
Figure 2:
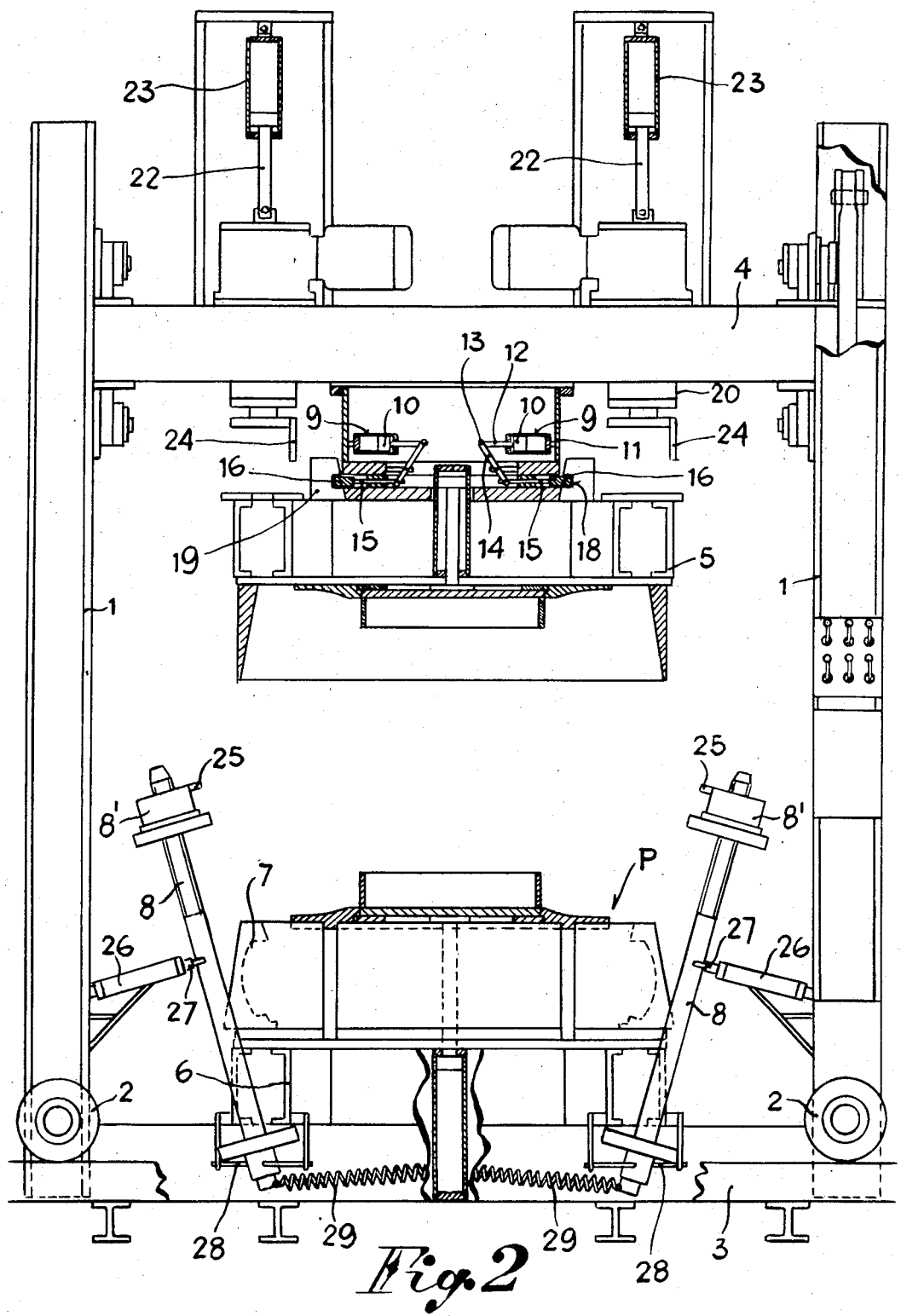
FIG. 2 is a partial sectional view of the assembly of FIG. 1, showing the upper half of the press in raised position.
Figure 3:
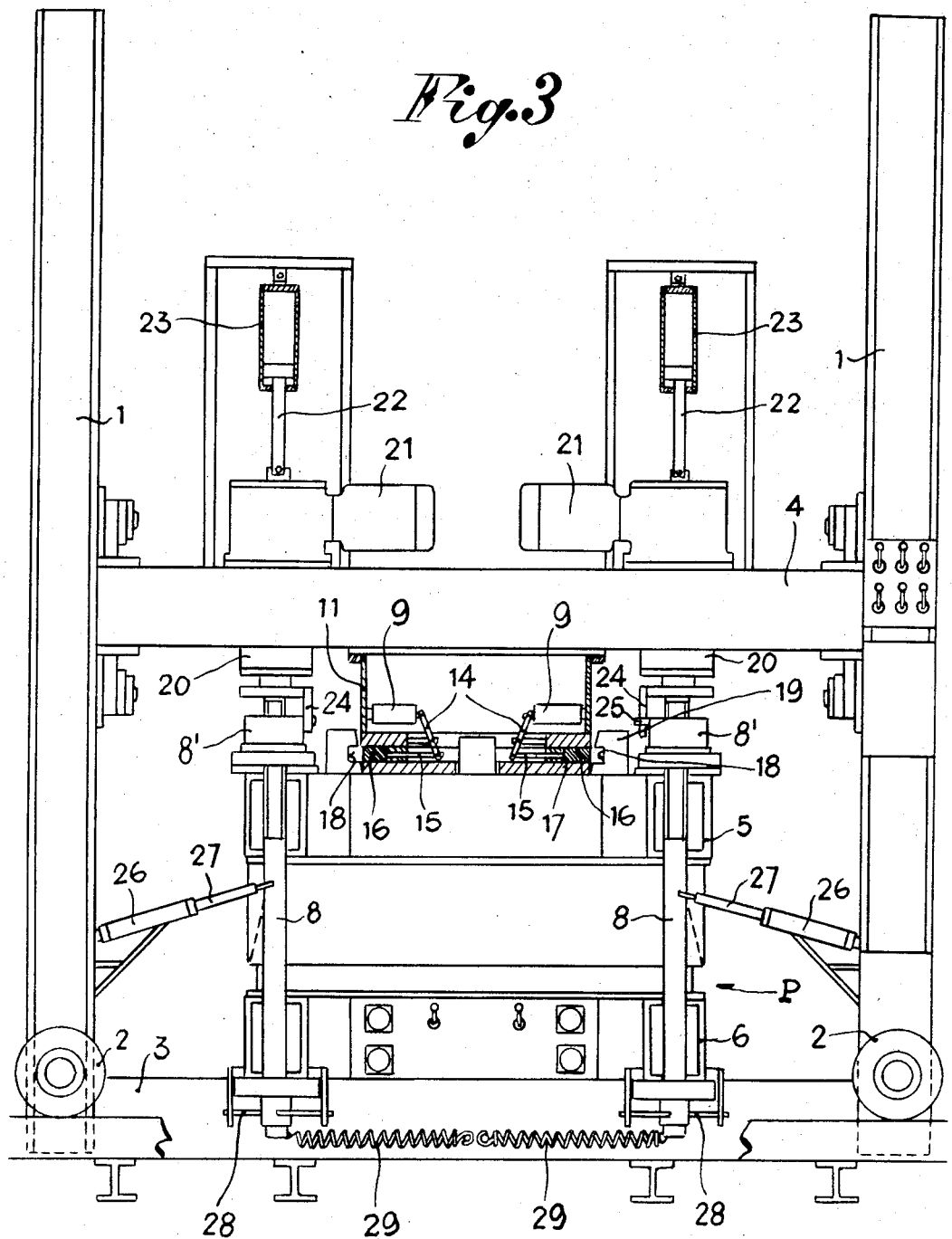
FIG. 3 is a partial sectional view of the assembly of FIG. 1, showing the upper half of the press in lowered position.

Referring now to the accompanying drawings, the device comprises a bridge frame having a plurality of supports 1, with wheels 2 resting on guide rails 3. On the frame is mounted a cross member 4 which is vertically movable on the frame by means of conventional mechanism. Beneath the cross member 4 there is located a suitable expanding means for engagement of the upper half 5 of the press assembly P for the retreading of the tire. The other half of the press is indicated at 6 and is base-fixed relative of the upper half 5 and carries the mold 7 as well as the screw stays 8 with threaded portions 8' utilized for locking and unlocking the upper and lower halves of the press to and from each other during the retreading operation.

The means for the raising of the upper half 5 of the press, mounted on the same, comprise the cylinders 9 and the respective pistons 10, actuated pneumatically, hydraulically or by other means. Pistons 10 are positioned radially within casings 11 which are integral with the cross member 4. On the shafts 12 of the pistons 10 there are connected at 13 the coupling levers 14, which have their opposite extremities connected to rods 15. Rods 15 control the annular segments 16 which are capable of horizontal displacement within the radial guide seats 17, so as to engage within the corresponding U-shaped seats 18 provided in the inner surface of the annular flange 19 which is integrally constructed with the upper half 5 of the press.

On the cross member 4, guided on the supports 1, there is furthermore mounted a plurality of means acting on the threaded portions 8' of the screw stays 8 for locking and unlocking the two halves of the press. Each of said means comprises a vertical and rotatable mandrel 20, controlled by a suitable reduction-motor 21, said mandrel being axially displaceable by means, for example, of piston 22 of the cylinder 23. To the lower end of the mandrel there is fixedly connected a pulling or dragging means 24 which engages the radial tappet 25. Tappet 25, of course, is integrally attached to the threaded portion 8' of the screw stay 8 so as to thread or unthread the portion 8' depending on the direction of rotation of the mandrel and, thus, obtain the locking or unlocking of the press halves 5 and 6.

The bridge frame of the device is also provided, in its lower portion, with cylinders 26 having pistons 27, pneumatically, hydraulically or otherwise operated, to engage individually the screw stays 8 and cause them to effect angular displacements about the respective lower pivoting means 28 and to come to rest within the predeterminedly provided seats in the lower half of the press 6 and in the upper half of the press 5, respectively. The disengagement of the screw stays 8 from the aforementioned seats is then achieved by means of springs 29 acting on the screw stays 8 in an opposite direction to that of said pistons 27.

The bridge frame of the device of the invention is mounted with its wheels 2 on the guide rail 3, so as to be able of being moved along the ground. Along the path covered by the frame, a plurality of presses $P_1$, $P_2$, $P_3$, $P_4$, etc., may be aligned, each press comprising, as stated earlier, the base with its fixed lower half 6 carrying the mold, the screw stays 8 and the removable upper half 5.

In accordance with an embodiment of the invention, the movable frame may be displaced along the path determined by the guide rails 3, so as to be brought in juxtaposition with any one of the presses $P_1$, $P_2$, $P_3$, $P_4$, etc. and to cooperate therewith for adjusting the tire in the mold, locking the two halves of the press 5 and 6 and, finally, after the tire has been retreaded, unlocking the said two halves 5 and 6 and of their screw stays to open the mold 7.

The frame is brought in juxtaposition with a preselected press, for example $P_1$, and, after lowering the cross member 4, it is then possible to engage the upper half of the press 5 and to raise it by raising the cross beam. Said engagement of the half 5 is effected by means of the expandable annular segments 16 controlled by the respective pistons 10 of the cylinders 9. This is readily seen in FIG. 1.

After the tire is positioned in the mold 7, the cross member 4 is again lowered so as to bring the upper half 5 in mating position with the lower half 6. The upper half 5 is then freed from the engaging members 16. At this point, pistons 27 of the lateral cylinders 26 come into play and carry the screw stays 8 in their respective seats provided in the two halves 5 and 6 of the press. Subsequently, the pullers 24 of the mandrels 20 are set into rotation and thread concurrently the threaded sections 8' to lock the two halves one against the other. At this stage, the press is ready to enter the actual tire-retreading phase and the frame is free to be moved along the guide-rails 3 to repeat the locking operation of another press unit.

In practice, therefore, the device of the invention is capable of serving more than one press by means of a single controlling mechanism, thus exploiting to a maximum the retreading operation while retaining the capital investment thereof to a minimum.

What is claimed is:

1. Rail-guided, movable device for use in the press-mold retreading of tires, comprising: guide rails, a bridge frame having wheels to run on said guide rails, a cross member mounted on said frame and capable of vertical displacement, an upper half of the press-mold supported on said cross member, an expandable annular means mounted on said cross member for engaging and supporting said upper half of said press-mold, screw stays mounted on said cross member for threaded portions thereon for locking and unlocking said upper half of said press-mold, a fixed lower half of the press-mold supported on bases aligned along the path of said guide rails, said frame being capable of moving along said guide rails to come into juxtaposed engagement with said lower half of said press-mold.

2. The device as claimed in claim 1, wherein said expandable annular means comprises a cylinder with respective pistons, positioned radially in supporting means attached to said cross member, a coupling lever cooperating with said piston, and horizontally displaceable annular segments engaged in seats provided on a flange integrally provided on said upper half of said press-mold.

3. The device as claimed in claim 1, wherein said bridge frame is provided with cylinders and pistons means capable of angular displacement to thread and unthread the said screw stays in order to lock and respectively unlock said upper and lower halves of said press-mold to and from each other, said screw stays being engaged at their lower extremities to said lower half of said press-mold.

4. The device as claimed in claim 1, wherein said screw stay comprises a vertically rotatable mandrel, controlled by means of a motor-reducing means, axially displaceable by means of piston action, and having a puller cooperating with a radial tappet, said tappet being integrally connected with the threaded portion of said screw stay.

* * * * *